Figure 1:
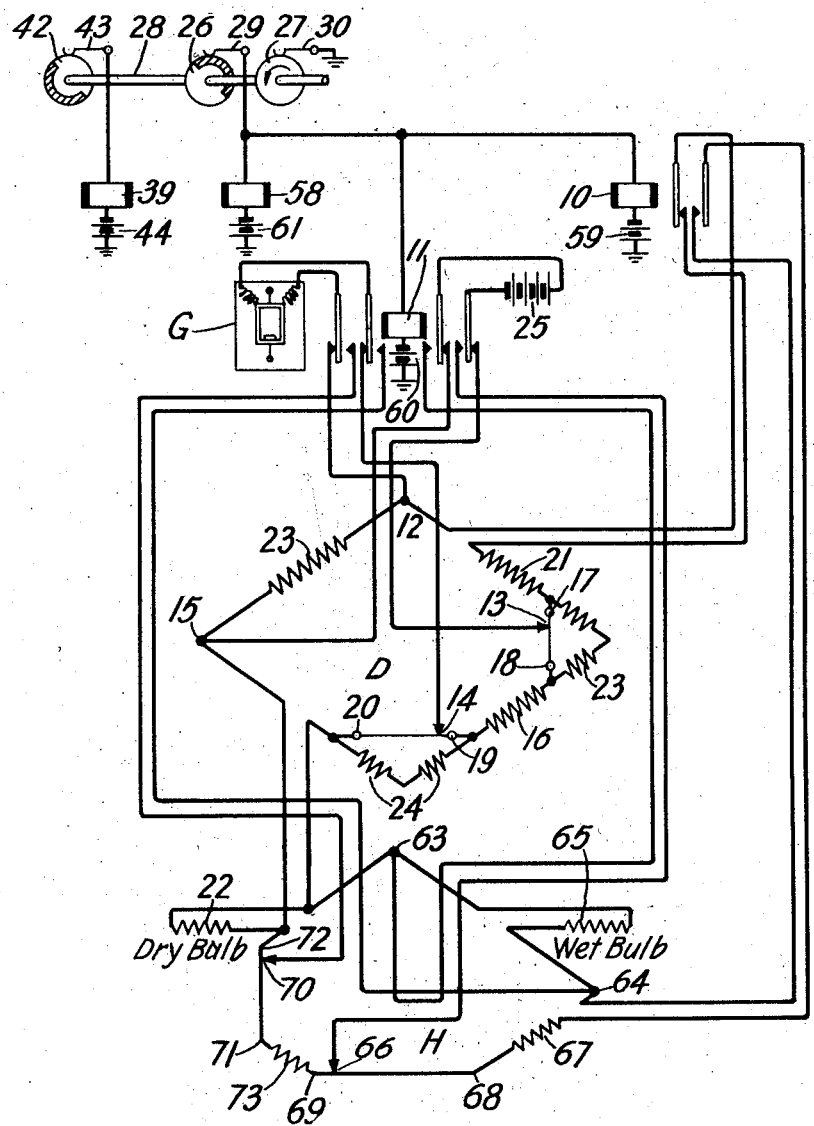

Oct. 30, 1928.

E. B. WOOD 1,689,313

DIRECT HUMIDITY RECORDER

Filed March 18, 1926      2 Sheets-Sheet 1

Inventor:
Ernest B. Wood.
by  J.G.Roberts  Att'y.

Oct. 30, 1928.
E. B. WOOD
DIRECT HUMIDITY RECORDER
Filed March 18, 1926    2 Sheets-Sheet 2
1,689,313
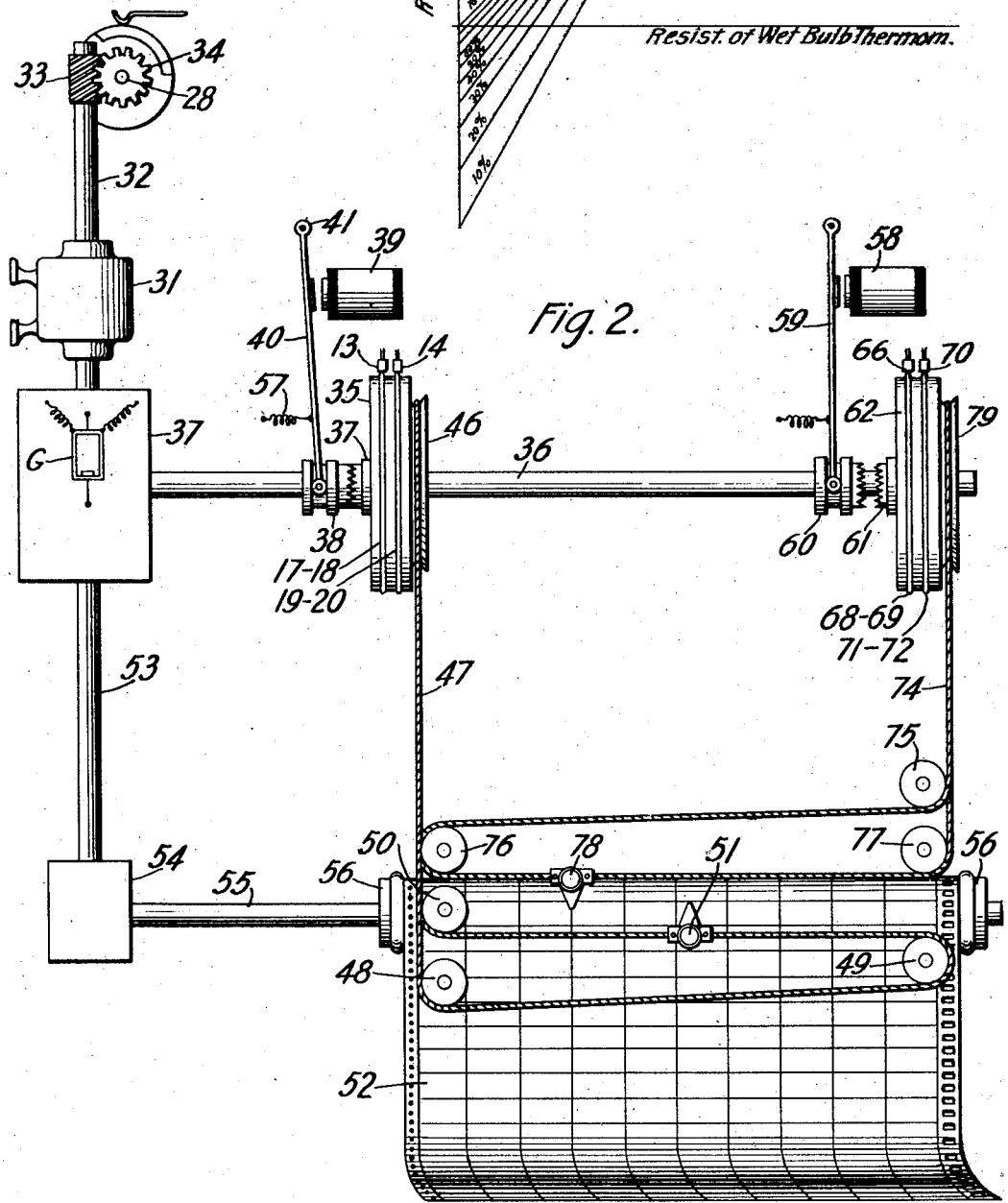
Inventor:
Ernest B. Wood.
by    J. G. Roberts    Atty.

Patented Oct. 30, 1928.

1,689,313

UNITED STATES PATENT OFFICE.

ERNEST B. WOOD, OF CHATHAM, NEW JERSEY, ASSIGNOR TO WESTERN ELECTRIC COMPANY, INCORPORATED, OF NEW YORK, N. Y., A CORPORATION OF NEW YORK.

DIRECT-HUMIDITY RECORDER.

Application filed March 18, 1926. Serial No. 95,572.

This invention relates to measuring and recording devices and is particularly adaptable to a device for continuously measuring and recording values of relative humidity.

The object of the invention is in general to provide a method of measuring relative humidity and means for continuously recording the measured values although in its broader aspects the invention is not limited to this particular application.

Relative humidity, which is a measure of the amount of moisture in the atmosphere at a given temperature, may be calculated from the temperatures recorded by wet bulb and dry bulb thermometers exposed to the atmosphere. Although the calculation required is not particularly involved, considerable time is saved by plotting curves of relative humidity having wet bulb and dry bulb temperatures as coordinates. These curves may be found in engineering handbooks and, where the value of the relative humidity is required at frequent intervals, these curves are utilized.

Various machines have been built for giving substantially continuous records of relative humidity based on those curves. The thermometers used in these machines are of the resistance type and are incorporated in Wheatstone bridge arrangements. There is usually a bridge for each thermometer, the thermometer forming one arm of the bridge.

The bridges are balanced with changing temperature and in balancing change the resistance in certain arms of a third bridge which in turn is balanced, giving the relative humidity. By a proper selection of resistances and an automatic bridge balancing mechanism a substantially continuous record of relative humidity may be obtained. Such a bridge balancing mechanism is described in U. S. Patent to Leeds No. 1,125,699 of January 19, 1915.

As mentioned above, in the arrangement of relative humidity recording devices heretofore used, the relation of the wet bulb and the dry bulb temperatures has been utilized. The curves of relative humidity so drawn approach and intersect each other at points, all of which are near the origin of the axes. For practical purposes it has been assumed that these curves meet at a point.

Since the point of crossing of the curves is not the origin, adjustment must be made to compensate for the difference or, in other words, to move the axes of the coordinates to this point. Such an arrangement is described in U. S. Patent to Wood, No. 1,493,586 of May 13, 1924.

The present invention is based on curves of relative humidity plotted with the resistance of the wet bulb and dry bulb thermometers as coordinates. When the resistance of the dry bulb thermometer as ordinates and the resistance of the wet bulb thermometer as abscissæ and with the 100% humidity curve passing through the origin, it is found that any curves other than the 100% curve will intersect the zero datum of wet bulb resistance at a point below the zero datum of the dry bulb resistance.

It is well known that the ratio of wet bulb resistance or temperature to dry bulb resistance or temperature will give a measure of relative humidity, therefore, in order to determine the ratio of the resistances ⸺ slope of any humidity curve other than the 100% curve, resistance must be added to the dry bulb resistance, that is, correction need be made in the resistance of only one of the thermometers instead of both. In the embodiment of the invention herein described this is accomplished by using the ordinary Wheatstone bridge and a variable resistance in the dry bulb arm in addition to the change in resistance occasioned by the change in dry bulb temperature, while the resistance in the wet bulb arm is varied only in accordance with its change in temperature.

The invention will be more clearly understood from the following description in conjunction with the attached drawings in which Fig. 1 is a schematic diagram of the circuit arrangement of the bridges, galvanometer, relays, etc., Fig. 2 shows the general arrangement of the bridge balancing mechanism and the manner of adjusting the pens in cooperation with a chart to record dry bulb temperature and relative humidity and Fig. 3 shows the relative humidity curves drawn with the respective thermometer resistances as coordinates.

Referring now more particularly to Fig. 3, curves of relative humidity are shown varying from 10% to 100%. It will readily be seen that to determine the slope of any curve except the 100% curve, the origin of the coordinates will have to be shifted. It will also be seen that with such curves the shifting need be done only on the axis of the ordinates.

This is accomplished by adding resistance in the dry bulb arm of the bridge in a manner which will appear hereinafter.

In Fig. 1 two Wheatstone bridges are shown, the one designated "D" will be known as the dry bulb bridge and is arranged to govern the indicating and recording of dry bulb or room temperature. The second bridge designated "H", will be known as the humidity bridge, and is arranged to govern the indicating and recording of relative humidity.

The arrangement shown is such that only one dry bulb thermometer is used. This is accomplished by connecting the dry bulb thermometer in one arm of each bridge and open circuiting that bridge which is not to be used by means of a relay 10. Both thermometers are of the resistance type having, preferably, straight line characteristics.

The dry bulb bridge is composed of arm 12—13 including a contact and armature of relay 10 and fixed resistance 21; arm 13—14 including a fixed resistance 16 and portions of slide wire resistances 17—18 and 19—20; arm 14—15 including dry bulb thermometer 22 and a portion of slide wire 19—20, and arm 15—12 including fixed resistance 23. Slide wire resistances 17—18 and 19—20 are shunted by comparatively low fixed resistances 23 and 24 respectively.

Moving contact points 13—14 are mechanically joined so that their movement relative to their respective slide wires is the same. This arrangement is shown more in detail in Fig. 2 where contacts 13 and 14 are stationary and the slide wires 17—18 and 19—20 are mounted on a rotatable drum in a manner that will appear hereinafter.

As illustrated in Fig. 1, the apparatus is arranged for determining and recording dry bulb temperatures, relays 10 and 11 being de-energized. Relay 10 at its outer armature maintains one of the arms of the humidity bridge "H," open and at its inner armature maintains arm 12—13 of the dry bulb bridge "D," closed. Relay 11 at its right inner and outer armatures and back contacts connects battery 25 to points 13 and 15 of the dry bulb bridge. At the back contacts of the left inner and outer armatures of relay 11, galvanometer "G" is connected across points 12 and 14 of the dry bulb bridge.

The energization of relays 10 and 11 is controlled by a commutator 26 and collector ring 27, mounted on a shaft 28, which have cooperating contact arms 29 and 30 respectively. Shaft 28 is continuously driven by a motor 31 (Fig. 2) through shaft 32 and worm 33 and wheel 34 fixed to the shaft 28.

The bridge is balanced by moving, relatively, the contact points 13 and 14 on slide wires 17—18 and 19—20 respectively. As mentioned above, these slide wires are mounted on a drum 35. This drum is loosely mounted on a shaft 36 driven by motor 31 through gears contained in box 37 controlled by the galvanometer "G." This galvanometer controls a clutch mechanism, for the actuation of shaft 36, and when the galvanometer needle is not in the neutral position shaft 36 is caused to rotate. As this mechanism is fully described in the above mentioned Leeds patent and as it forms no part of the present invention, a full description is not given here.

Drum 35 has fixed thereto one element 37 of a clutch member, the other element 38 of the clutch being slidably mounted on shaft 36, but arranged to rotate with it. Clutch element 38 is controlled by a magnet 39 through an arm 40 pivoted at 41.

The energization of magnet 39 is controlled by a commutator 42 also mounted on shaft 28 which has a cooperating contact arm 43. In the position shown a circuit is closed from grounded battery 44 through magnet 39, contact arm 43, commutator 42, shaft 28, collector ring 27, contact arm 30, to ground. Arm 40 is attracted to the core of the magnet upon its energization thereby joining the two clutch elements 37 and 38 fixing drum 35 to shaft 36.

Assuming that the galvanometer needle is not in its mid-position due to the dry bulb bridge being out of balance, shaft 36 is then rotating and the drum 35 with it. Slide wires 17—18 and 19—20 are, therefore, moved relatively to contacts 13 and 14 until a balanced condition is reached whereupon the galvanometer needle assumes its mid-position, thereby stopping shaft 36.

Attached to the drum 35 is a pulley 46 over which passes an endless cord 47. This cord also passes over pulleys 48, 49 and 50 and carries a pen 51 arranged to cooperate with and make permanent record upon chart 52. Chart 52 is given a uniform motion and is divided preferably, in the direction in which it moves, in units of time. This motion is derived from motor 31 through shaft 53, gears in box 54 and shaft 55 on which is a roll 56 of wood, rubber or other suitable material to carry chart 52.

Roll 56 may be driven independently of the other apparatus as for example by a clockwork mechanism. The chart 52 preferably is provided with two scales in a direction parallel with the axis of the roll, one for dry bulb temperature and the other for percent relative humidity.

Pen 51 is positioned on cord 47 so that, as it is moved by the motion of pulley 46 attached to drum 35, it takes up a position relative to the chart 52 corresponding to the temperature as measured by dry bulb thermometer 22. Pen 51, therefore, upon the balance of the galvanometer records dry bulb temperatures.

As shaft 28 (Fig. 1) continues to rotate the circuit through magnet 39 will be opened when the insulating segment of commutator 42 comes in contact with contact arm 43. When magnet 39 deenergizes, arm 40 and clutch element 38 are retracted by spring 57 so that drum 35 again becomes free on shaft 36.

At the same time that the circuit is opened through magnet 39 contact arm 29 contacts with the conducting part of commutator 26. This closes the circuit through relays 10 and 11 and magnet 58, from grounded batteries 59, 60 and 61 respectively. These batteries may be combined in one battery but for the sake of clearness in the drawing they have been made individual. The common circuit after passing through the relays and magnet passes through contact arm 29, commutator 26, shaft 28, collector ring 27, contact arm 30 to ground. Relay 10 opens one arm of the dry bulb bridge and closes the open arm of the humidity bridge. Relay 11 at its right armatures transfers battery 25, and at its left armatures transfers galvanometer "G", from the dry bulb bridge to the humidity bridge. Magnet 58 attracts the arm 59 with the clutch element 60 which grips the clutch element 61 on drum 62, thereby fixing drum 62 to shaft 36 in the same manner as explained above for drum 35.

Humidity bridge "H" is composed of arm 63—64 including wet bulb thermometer 65; arm 64—66 including outer armature and front contact of relay 10, fixed resistance 67 and a part of slide wire resistance 68—69; arm 66—70 including fixed resistance 73 and part of slide wire resistances 68—69 and 71—72, and arm 70—63 including dry bulb thermometer 22 and part of slide wire resistance 71—72.

Assume again that the needle of the galvanometer "G" is not in its mid-position, due to the unbalance of the humidity bridge. Slide wire resistances 68—69 and 71—72 are mounted on the drum 62 (Fig. 2) and have cooperating contacts 66 and 70 in the same manner as drum 35, etc.

Since magnet 58 has been energized as explained above, drum 62 turns with shaft 36 as controlled by galvanometer "G." Drum 62 has fixed to it a pulley 79 over which passes an endless cord 74, which also passes around pulleys 75, 76 and 77 back to 79 and carries with it pen 78 arranged to make a record on chart 52.

It will be seen from Fig. 1 that in balancing humidity bridge "H" resistance is either added to or taken from the dry bulb arm according as point 70 moves relatively toward or away from point 71. In this way the required resistance is joined with the resistance of the dry bulb thermometer, as represented in Fig. 3, to shift the origin of the coordinates. The other arms 64—66 and 66—70 (Fig. 1) are also changed accordingly, with the relative movement of only two contact points.

It is desired to point out that slide wires 71—72 and 68—69 are not uniform. The reason for this will be more clearly seen from Fig. 3 where the humidity lines intersect the axis through the zero datum of wet bulb resistance in progressively increasing intervals from the 100% line to the 10% line. This, of course, is due to the difference in slope of the lines, from which it follows that to obtain a balance, slide wire 71—72 is preferably non-uniform. If slide wire 71—72 were uniform, it would require that chart 52 be non-uniform and as it is preferable to have the chart uniform, it is necessary that slide wire 71—72 be non-uniform. In balancing the bridge for a given atmospheric condition three arms of the bridge are adjusted, namely, 63—70, 70—66 and 66—64. The gradations of slide wire 68—69 of course are dependent on slide wire 71—72.

With such an arrangement increased accuracy is obtainable since there are only two sliding contacts where errors might occur due to imperfections.

As described above in connection with pen 51, pen 78 is moved in accordance with the movement of drum 62 and takes up a position relative to chart 52 to record the per cent of relative humidity.

As shaft 28 rotates continuously and as the dry bulb temperature and humidity are recorded alternately, the speed of the shaft will control the frequency of the record. If this recording is rapid as compared with the movement of the chart, a practically continuous curve will be traced.

As mentioned above, this invention is not limited to the specific application shown, that is, relative humidity, but may be used in determining any quantity which is the function of two variables.

What is claimed is:

1. A method of indicating values of a quantity, which is a function of two variables, which comprises balancing a Wheatstone bridge in which two of the arms have resistances proportional to the two variables, and the other two arms have resistances depending upon the resistance of one of said first mentioned arms.

2. A method of indicating values of relative humidity, which comprises balancing an electrical bridge in which one arm has a resistance proportional to wet bulb temperatures, a second arm has a resistance proportional to dry bulb temperatures plus a certain resistance, the third and fourth arms having resistances depending upon the resistance added to said second arm.

3. A method of indicating values of relative humidity, which comprises balancing an electrical bridge in which two of the arms have resistances depending upon the atmospheric conditions, the other two arms having resistances depending upon the resistance in one of the first mentioned arms.

4. A method of indicating values of relative humidity, which comprises balancing an electrical bridge in which the resistance of one arm and a part of the resistance of a second arm are entirely dependent upon atmospheric conditions, the remainder of the resistance of said second arm and the resistances of the other arms being adjusted automatically and simultaneously.

In witness whereof, I hereunto subscribe my name this 10th day of March, A. D. 1926.

ERNEST B. WOOD.